United States Patent [19]
Alling

[11] 3,778,124
[45] Dec. 11, 1973

[54] SEPARATOR INSERT FOR THRUST BEARINGS

[75] Inventor: Richard L. Alling, Torrington, Conn.

[73] Assignee: The Torrington Company, Torrington, Conn.

[22] Filed: Jan. 17, 1972

[21] Appl. No.: 218,159

[52] U.S. Cl. .............................................. 308/235
[51] Int. Cl. ........................................... F16c 33/38
[58] Field of Search.................... 308/235, 217, 201

[56] References Cited
UNITED STATES PATENTS

| 1,169,881 | 2/1916 | Sorensen | 308/235 |
| 2,724,625 | 11/1955 | White | 308/235 |
| 3,572,862 | 3/1971 | Teramachi | 308/235 |

FOREIGN PATENTS OR APPLICATIONS

| 511,562 | 9/1920 | France | 308/235 |

Primary Examiner—Charles J. Myhre
Assistant Examiner—Frank Susko
Attorney—Frank S. Troidl et al.

[57] ABSTRACT

A thrust bearing separator insert is claimed which reduces wear due to inertial forces in high speed bearings, and prevents wedging of retainer halves in high thrust applications.

4 Claims, 5 Drawing Figures

PATENTED DEC 11 1973
3,778,124
FIG. 1
FIG. 2
FIG. 3
FIG. 4
FIG. 5
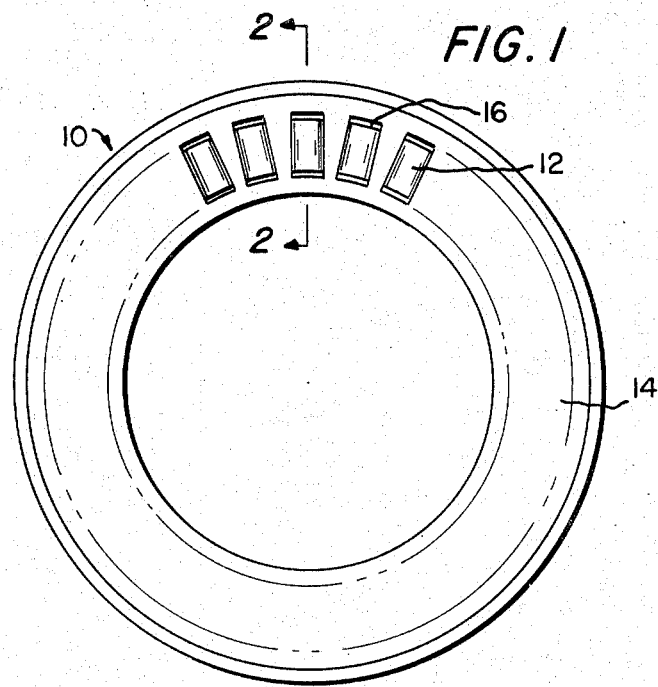
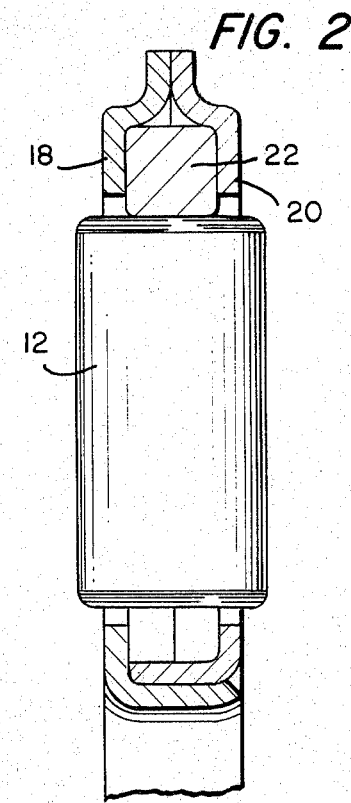
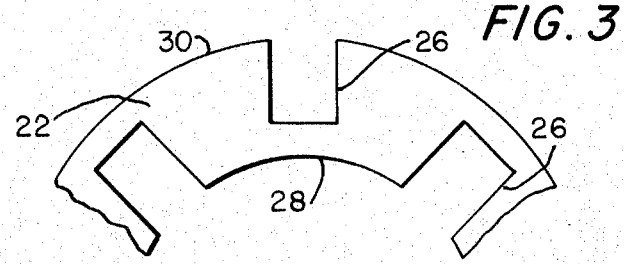
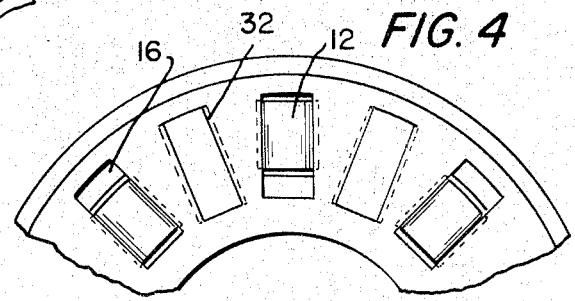
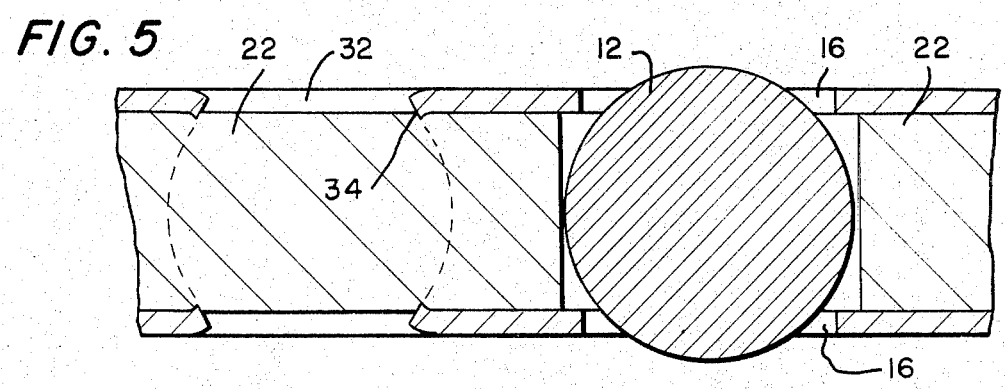

SEPARATOR INSERT FOR THRUST BEARINGS

This invention relates to a thrust bearing assembly. More particularly, this invention is a new and improved thrust bearing separator insert wherein radial inertial thrust is absorbed by the insert and undue wear of the retainer body is prevented. Further, circumferential skewing is controlled to prevent wedging apart of the retainer halves.

The basic thrust bearing assembly generally comprises roller members captured between two retainer halves In high speed applications, the inertial forces press the outboard end of the roller members against the pocket edges of the retainer halves. The rapidly turning roller member operates as a grinding wheel against the thin sections of the retainer halves, and frequently wears the pockets to such a degree that the filings damage the rest of the bearing or bearing operation is noisy and hot. Rollers have been known to grind completely through the end of a retainer.

In slower speed, high thrust, marginal lubrication applications the axes of the rollers members tend to skew so that the rollers wedge between the retainer halves. This results at best, in increased frictional drag on the bearing, and at worst, in wedging of the roller members between the retainer halves causing destruction of the bearing assembly. The bearing retainer must impart significant guiding forces to the rolling members to maintain the radial positioning of the roller axes. My invention solves these problms by introducing a separator insert between the retainer halves to provide high guidance forces to the rollers and to significantly improve performance in marginal lubrication situations.

The invention as well as its many advantages may be further understood by reference to the following detailed description and drawings in which:

FIG. 1 is a plan view of a needle thrust bearing;

FIG. 2 is a partial section of a bearing with a separator insert;

FIG. 3 is a partial view of one embodiment of the insert;

FIG. 4 is a partial plan view of a thrust bearing with alternate pockets vacant; and FIG. 5 is a partial section of the bearing in FIG. 4 taken along line 5—5.

Like parts throughout the various views are referred to by like numbers.

DESCRIPTION OF THE INVENTION

In a needle thrust bearing generally indicated by 10 in FIG. 1, roller members 12 are held in position by a retainer 14 with uniformly spaced pockets 16. Partial section, FIG. 2, shows the retainer comprises an inner half 18 and an outer half 20. The separator insert 22 may comprise an annular ring against which the outboard end of the roller member 24 will bear on its center line. By absorbing the inertial force of the roller in a high speed bearing, the insert reduces stresses at the outer end of the pockets which otherwise may be worn away during a short period of service. Under slow speed, high thrust service conditions, the embodiment shown in FIG. 3 has advantages. Radial slots 26 alternately pierced from the bore 28 and outer diameter 30 of the insert 22 have a width greater than that of the pockets 16 which prevent escape of the roller members 12 ans can be readily seen in FIGS. 4 and 5. Alternate pockets 32 may be left vacant and circumferential slippage between retainer halves and insert prevented by stakes 34 at the empty pockets. If bearing size permits, vacant pockets will not be required and slippage can be prevented by spot welding the retainer halves to the separator.

In operation, the roller member 12 is prevented from escaping by the retainer halves 18 and 20. The separator insert 22 provides rigidity and strength to the assembly and increases the bearing area at the outboard end of the roller member 24 thereby absorbing the inertial force of the rollers against the retainer halves and preventing wear and consequent damage to the assembly. By guiding the longitudinal face 36 of the roller members, separator 22 controls the skewing of the roller axis and prevents a wedging action of the roller between the retainer halves which tends to separate them and increase friction in high thrust applications. separation of the rollers from the radial edges of the pockets further facilitates lubrication of the bearing

I claim:

1. In a bearing assembly having roller members and roller retainer halves comprising annular members with inner and outer peripheries and roller pockets, the retainer halves being adjacent at their inner and outer peripheries and their pockets in circumferential alignment, the improvement wherein a separator insert is positioned between the retainer halves, the separator insert comprising a circular ring having a series of radial slots extending from the inner bore only and roller members are located in at least half of the radial slots with the outer end of each roller bearing against the outer edge of the corresponding radial slot.

2. The improvement of claim 1 wherein the separator insert comprises a series of radial slots pierced alternately from the bore and the outer diameter of the ring spaced in registry with the roller pockets in the retainer halves, whereby roller contact with the radial walls of the pockets in the retainer havles under loaded bearing conditions would be prevented.

3. The improvement of claim 2 wherein the radial length of the separator slots accommodates a shorter length roller than the pockets of the retainer halves.

4. The improvement of claim 2, wherein the separator insert is staked into the retainer halves in vacant pocket positions thereby controlling circumferential slippage.

* * * * *